US012673400B2

(12) United States Patent (10) Patent No.: US 12,673,400 B2
Cox, Jr. (45) Date of Patent: Jul. 7, 2026

(54) ELECTRICAL BOX KNOCK-OUT TOOL

(71) Applicant: Robert Cox, Jr., Dyer, IN (US)

(72) Inventor: Robert Cox, Jr., Dyer, IN (US)

( * ) Notice: Subject to any disclaimer, the term of this patent is extended or adjusted under 35 U.S.C. 154(b) by 0 days.

(21) Appl. No.: 17/732,283

(22) Filed: Apr. 28, 2022

(65) Prior Publication Data

US 2022/0250221 A1     Aug. 11, 2022

Related U.S. Application Data

(62) Division of application No. 17/232,766, filed on Apr. 16, 2021, now abandoned.

(60) Provisional application No. 63/010,953, filed on Apr. 16, 2020.

(51) Int. Cl.
| | |
|---|---|
| *H02G 3/08* | (2006.01) |
| *B25B 27/14* | (2006.01) |
| *H02G 1/00* | (2006.01) |
| *H02G 3/18* | (2006.01) |
| *B67B 7/16* | (2006.01) |

(52) U.S. Cl.
CPC .............. *B25B 27/14* (2013.01); *H02G 3/18* (2013.01); *B67B 7/16* (2013.01); *Y10T 29/53896* (2015.01)

(58) Field of Classification Search
CPC ......... B25B 27/14; B25B 27/24; B25B 33/00; B25B 27/02; B25B 11/005; H02G 3/18; H02G 3/085; H02G 1/00; E04G 2023/085; B65G 7/02; B65G 7/08; B25C 11/00; B66F 15/00; Y10T 29/53896; B67B 7/16; H01L 21/6875; H01L 21/6838; G03F 7/707

USPC ........ 29/278, 267, 270; 254/21, 25, 28, 121, 254/131.5, 132; 72/458, 459; 81/488, 81/3.55; 7/166; 220/284, 3.2; 225/103; 269/21; 451/388; 279/3; 355/73; D8/40

See application file for complete search history.

(56) References Cited

U.S. PATENT DOCUMENTS

| | | | | |
|---|---|---|---|---|
| 546,521 A * | 9/1895 | Gatti | .......................... | B25F 1/00 |
| | | | | 7/169 |
| 972,774 A * | 10/1910 | Murray | .................... | B67B 7/16 |
| | | | | 81/3.55 |
| 2,000,851 A * | 5/1935 | Knell | .................... | H02G 3/085 |
| | | | | 285/194 |
| 2,106,639 A * | 1/1938 | Jenkinson | ................. | B67B 7/16 |
| | | | | D8/40 |
| 2,239,719 A * | 4/1941 | Jarrett | ..................... | B25D 1/04 |
| | | | | 254/26 R |

(Continued)

*Primary Examiner* — Mahdi H Nejad
(74) *Attorney, Agent, or Firm* — Wood, Phillips, Katz, Clark & Mortimer

(57)            ABSTRACT

The invention disclosed is a tool for the removal of knock-outs from electrical boxes. The tool may include a handle connected to an elongate member such as a rod, the elongate member having a bend between the handle and a termina end that is bent back or forms a hook. The terminal end may include a flattened end and a slot opened at the end to allow the user to engage the edge of a knock-out. The tool may also include a groove in the radius or bend of the hook, also to allow the user to engage the edge of a knock-out. The tool also includes notches on the elongate member to allow the user to engage the edge of a an electrical box to manipulate or rotate the tool about the engagement to dislodge or displace the knock-out from the electrical box with the tip of the terminal end.

20 Claims, 3 Drawing Sheets

(56)  References Cited

U.S. PATENT DOCUMENTS

| | | | | |
|---|---|---|---|---|
| 4,509,242 | A * | 4/1985 | Marra | H02G 1/00 |
| | | | | D8/89 |
| 4,805,303 | A * | 2/1989 | Gibbs | B26B 11/001 |
| | | | | 30/155 |
| 5,542,139 | A * | 8/1996 | Boivin | B26B 1/02 |
| | | | | 81/20 |
| D382,453 | S * | 8/1997 | Drinkwater | D8/18 |
| 5,937,695 | A * | 8/1999 | Patterson | H02G 1/00 |
| | | | | 81/427.5 |
| 6,971,281 | B1 * | 12/2005 | Jarvis | B67B 7/403 |
| | | | | D8/40 |
| 6,994,322 | B1 * | 2/2006 | Wittman | A44B 15/005 |
| | | | | 254/131 |
| 7,194,937 | B1 * | 3/2007 | Melkowits | B25B 7/02 |
| | | | | 81/426 |
| D669,331 | S * | 10/2012 | Burdyshaw | D8/105 |
| 2008/0035900 | A1 * | 2/2008 | Flores | B25B 33/00 |
| | | | | 254/21 |
| 2008/0219789 | A1 * | 9/2008 | Johnson | H02G 1/00 |
| | | | | 408/204 |
| 2010/0171083 | A1 * | 7/2010 | Vaught | B25B 27/06 |
| | | | | 254/21 |
| 2014/0237952 | A1 * | 8/2014 | Fesler | B67B 7/24 |
| | | | | 81/3.47 |

* cited by examiner

ELECTRICAL BOX KNOCK-OUT TOOL

CROSS-REFERENCE TO RELATED APPLICATIONS

This application is a division of U.S. patent application Ser. No. 17/232,766 filed Apr. 16, 2021, which claims priority to U.S. Provisional Application No. 63/010,953, filed Apr. 16, 2020, which are incorporated herein by reference.

FIELD OF THE INVENTION

The invention relates tools for the removal of knock-outs from electrical boxes used in the construction of buildings.

BACKGROUND ART

In the construction of buildings, electrical wires and communication wires may be run through conduit or other tubes. Metal or plastic enclosures, known as boxes, are typically used to join conduits and allow places where equipment such as outlets, switches, or other devices may be wired into the electrical circuit. Boxes may also be used where it may be desirable to join a plurality of circuits or wires, allowing an installer or repairman access to the wires.

The boxes, having a plurality of walls and a backplate defining an interior therebetween, typically have circular, pre-weakened, sections that can be knocked out to provide communication between a connected conduit and the interior of the box. These sections or knock-outs, may be removed by the installer by the use of moderate force. The knock-outs are typically pre-weakened by fully perforating a portion of the circumference of the wall or backplate of the box, leaving the knock-out retained to the box by a plurality of webs of material.

When an installer punches out or attempts to remove a knock-out from a box, he often breaks some, but not all of the webs connecting a knock-out to the wall of the box. The knock-out then hangs from the wall of the box by the still attached web. The installer much then re-engage the knock-out to fully force or remove the knock-out from the box.

The invention disclosed herein is a tool that allows the installer to force a knock-out from the wall of an electrical box, and also engage and fully remove the knock-out from the box.

SUMMARY OF THE INVENTION

The invention is a tool to allow an electrician to remove knock-outs from electrical boxes. The tool includes a handle connected to a rod or shaft. The shaft includes a distal portion that is set at an angle from the handle. The shaft includes a plurality of indentations for engaging the wall or edge of an electrical box to gain a pivot point for the tool. The tool further includes a flattened tip set at an angle to the shaft. The tip further includes a slot, the slot being tapered or wider at the tip. the slot allows the user to engage or grab a knock-out that is retained to the box wall by a web, so that the user may fully remove the knock-out from the box.

In one form, the invention is directed to a tool for removing knock-outs from electrical boxes. The tool includes an elongate member having a proximal end and a distal end. The elongate member has an angle between the proximal end and the distal end. The elongate member further has a hook between the angle and the distal end. The elongate member still further has at least one notch between the hook and the bend. The notch is open to the hook.

In one form, the tool further includes at least a second notch between the at least one notch and the hook.

In one form, the notch has a first wall perpendicular to an axis of the elongate member. A second wall is placed at an angle to the first wall.

In one form, the first wall and the second wall meet at a vertex. The vertex is perpendicular to an axis of the elongate member.

In one form, the at least one notch and the at least second notch are of the same size.

In one form, the at least one notch and the at least second notch are of different sizes.

In one form, the hook includes an outside angle. A groove is on the outside angle of the hook.

In one form, the groove is oriented lengthwise along the elongate member.

In one form, the invention is directed to a tool including an elongate member having a proximal end and a distal end. The distal end includes a hook portion. The elongate member has a bend between the hook and the proximal end. The elongate member has a first notch between the bend and the hook. The first notch has a first wall perpendicular to an axis of the elongate member and a second wall set at an angle to the first wall. The notch is open to the hook.

In one form, the tool includes a second notch between the hook and the first notch.

In one form, the second notch is positioned so that it is adjacent to the tip of the second end of the elongate member.

In one form, the inside angle of the hook is angled at 50 degrees.

In one form, the distal end includes a slot.

In one form, the slot has tapered walls.

In one form, the tool has a groove in an outside radius of the hook.

In one form, the tool has a groove in a bend of the hook. The groove has tapered walls.

In one form, the invention is directed to a tool for removing knock-outs from electrical boxes. The tool includes an elongate member having a first end and a second end. The elongate member is angled at a point between the first end and the second end. A hook portion is positioned adjacent the second end. The hook portion includes a slot at the second end and a groove at a bend of the hook. A first notch is located on the elongate member. The notch is open to the hook.

In one form, the elongate member includes a second notch. At least one of the notches is positioned below a level of a tip of the second end when a portion of the elongate member on which the notch is present is vertically positioned.

In one form, the interior angle of the hook is 50 degrees.

In one form, the angle of the elongate member at the point between the first end and the second end is 30 degrees.

DETAILED DESCRIPTION OF THE PREFERRED EMBODIMENT

Figure 1:
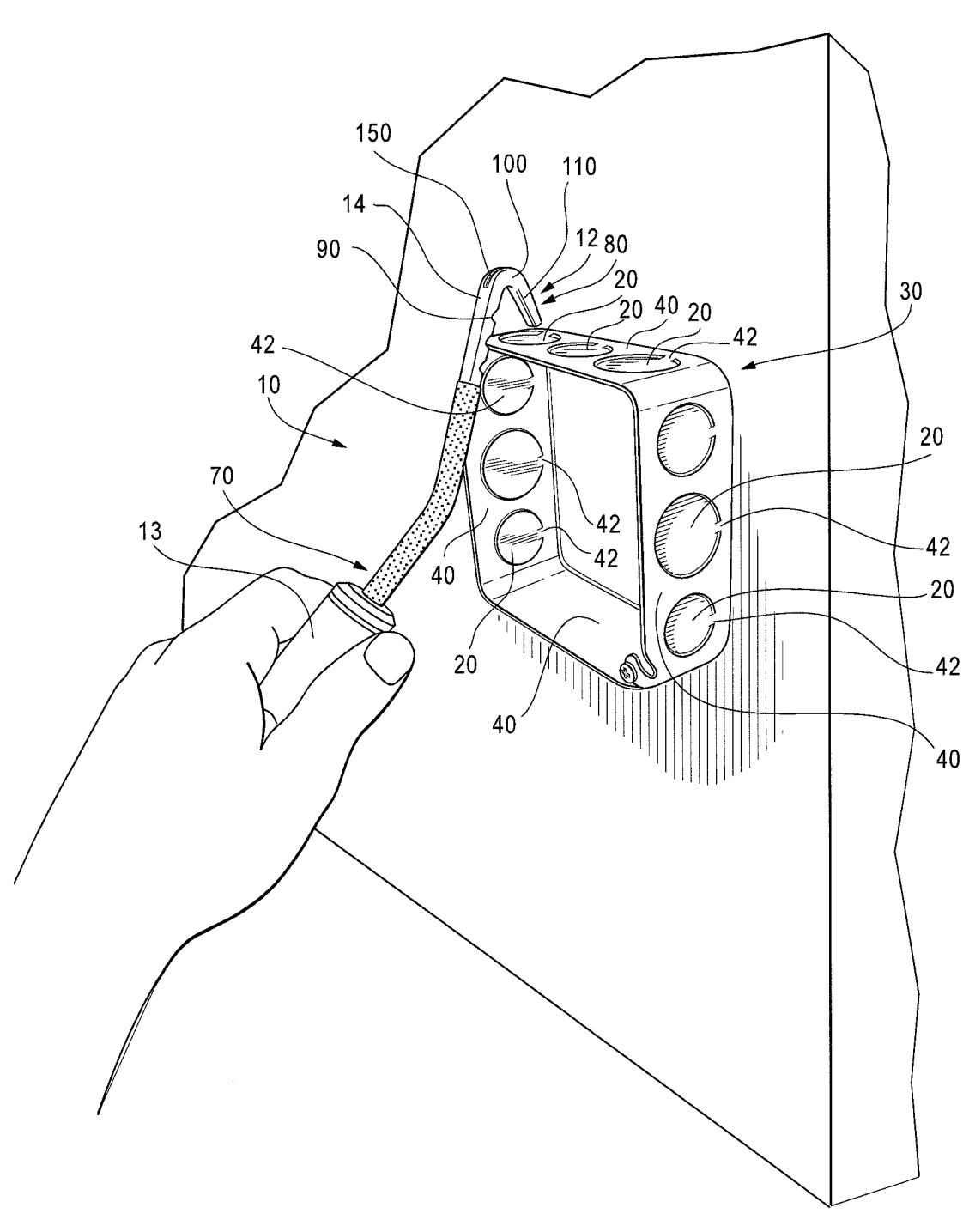
FIG. 1 is a perspective view of an electrical box having knock-outs for removal, and a tool of the present invention engaging an edge of the electrical box prior to removal of a knock-out.

With reference to the drawings, the tool 10 is for use in removing knock-outs 20 from electrical boxes 30.

The electrical box 30 typically includes four walls 40 and a back plate 50 to define a space therebetween. The walls 40 include a perimeter edge 41. Each of the knock-outs 20 are connected to the walls 40 by at least one web 42.

In some embodiments, the tool 10 includes a first end 11 and a second end 12. The tool first end 11 includes a handle 13 for grasping by the user. The tool 10 also includes an elongate member 14 connected to the handle 13. The elongate member 14 may be a rod, shaft, or any other structure that may be bent or constructed to include angles. The elongate member 14 is generally thinner than the handle 13, and may be of any cross section.

In some embodiments, the elongate member 14 is approximately 4.5 inches in length from the handle 13 to the hook 100, but may be of other dimensions.

In some embodiments the elongate member 14 includes a proximal end 70 nearest the handle 13, and a distal end 80. The elongate member 14 may extend into the handle 13, or in some embodiments the handle 13 may be a portion of the elongate member 14. The elongate member 14 is bent at an angle or preferably forms an angle of 30 degrees at a location between the proximal end 70 and the distal end 80 or the bend of the hook 100.

The elongate member 14 includes at least one notch 90 along its length. The notch 90 is preferably located between the bend and the distal end 80. In some embodiments, there are a plurality of notches. The notches are preferably located within 1.5 inches of the bend of the hook 100.

The notch 90 most preferably includes a first wall 91 perpendicular to the axis of the elongate member 14, and a second wall 92 angled away from the first wall 91. The first wall 91 and second wall meet at a vertex. The notch 90 is approximately 2-3 mm deep, but may vary in depth. In embodiments where more than one notch 90 is present, it is preferred that the notches be of varying depths. The notch 90 may be oriented so that the vertex where the first wall 91 and second wall 92 meet is perpendicular to the plane of a hook 100 at the distal end of the elongate member 14. In some embodiments the notch 90 is open to the side of the elongate member that has the hook 100, and thus is open to the hook.

In some embodiments the distal end 80 includes a hook 100. The hook is formed by bending or angling the elongate member 14 approximately 310 degrees. The bend or angle of the hook 100 may range plus or minus 40 degrees or may be of any suitable angle from perpendicular to the axis of the elongate member 14. In the most preferred embodiment, the inside angle of the bend is approximately 50 degrees, but may vary and include plus or minus 10 degrees from the 50 degrees. In the most preferred embodiment, the second end 12 of the elongate member 14 is past perpendicular with reference to the elongate member 14.

In some embodiments, the bend of the elongate member and the bend of the hook 100 are in the same plane. In some embodiments, the inside angle of the bend of the elongate member 14 and the inside angle of the bend of the hook 100 are on opposite sides of the axis of the elongate member 14.

In some embodiments the second end 12 terminates in a slot 110. The slot 110 may taper from its opening and at the opening it is wider than the thickness of the knock-outs 20. It is preferred that the slot 110 at its narrowest is narrower than the thickness of the knock-outs 20 so that the slot 110 may engage and grasp a knock-out 20 by an edge. It is typical for a knock-out to be approximately 0.05 to 0.075 inches thick and the slot 110 to have a widest width of 0.1 inch so that the knock-out will fit in the slot 110. However, the slot 110 may have any width to accommodate a knock-out. The slot 110 is preferably 0.25 inches deep, but may be as deep as an inch.

In some embodiments the elongate member 14 may include a groove 150 at the bend of the hook 100, but may be present on the inside bend. In some embodiments the groove 150 runs lengthwise to the elongate member 14, but it need not be. In some embodiments the length of the groove 150 may be perpendicular or at any angle to the axis of the elongate member. The groove 150 is preferably on the outside radius of the bend of the hook 100. The groove may have parallel walls 151 and 152 in some embodiments. In some embodiments, the groove 150 may have walls that have a spaced apart taper towards the bottom of the groove 150. The groove walls 151 and 152 may be spaced apart to accept the thickness of a knock-out 20. When a taper is present the groove 150 may better capture a knockout 20 for removal from the box. In some embodiments the groove may have a similar width to a slot 110.

In some embodiments the second end 12 is generally a tapered blade similar to a flat head screwdriver. It is preferable for the second end 12 to terminate at a level above the axis of the elongate member at the first end 11. In the most preferred embodiment, the second end 12 is above the axis of the first end 11 by approximately 1 mm. However, the second end 12 may be positioned above the axis of the first end 11 by more than 1 mm, or it may be lower than the axis of the first end 11, or it may be at the axis of the first end 11.

In some embodiments, the second end 12 is angled back or bent back so that the tip of the second end 12 is even with the second notch 90. In some embodiments, the tool includes a notch on either side of the second notch 90, such that one notch is closer to the proximal end 70 and the other notch closer to the distal end 80.

Figure 2:
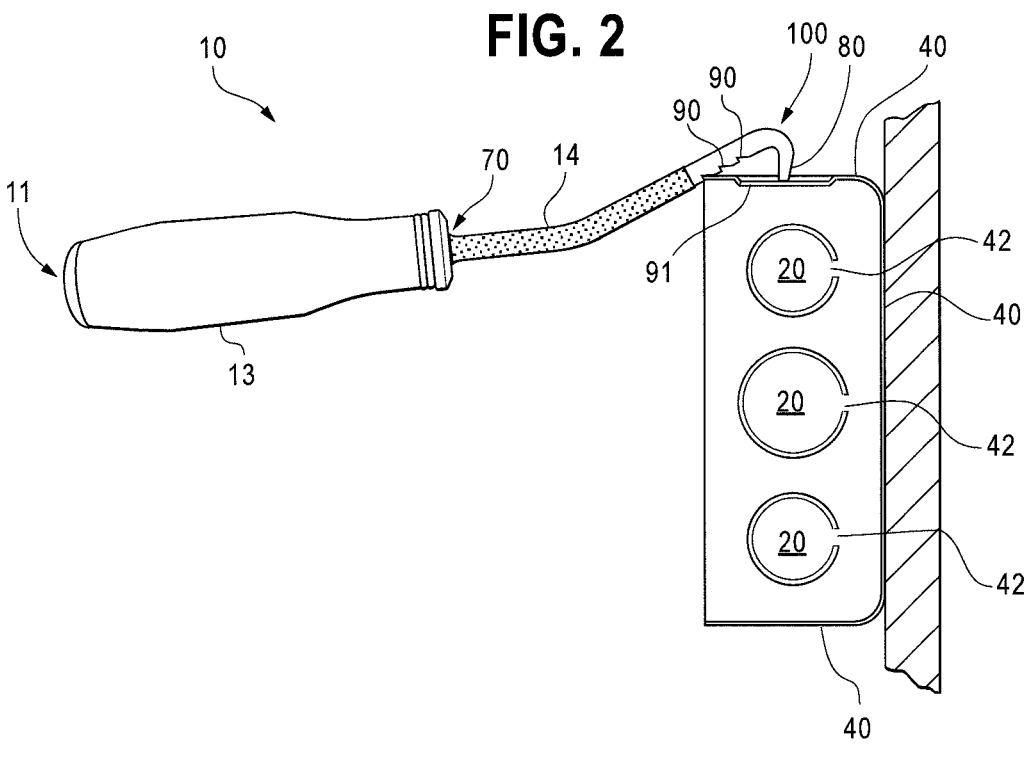
FIG. 2 is a side cross-sectional view of an electrical box having knock-outs for removal, and a tool of the present invention engaging an edge of the electrical box prior to removal of a knock-out.
Figure 3:
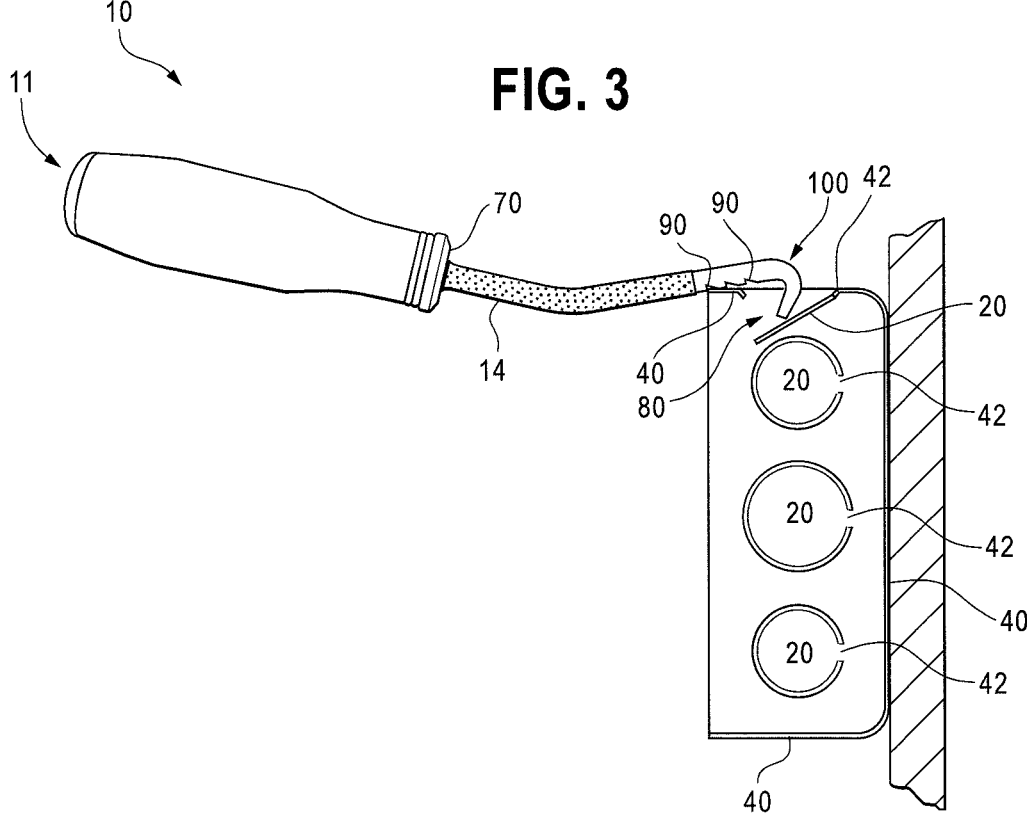
FIG. 3 is a side cross-sectional view of an electrical box having knock-outs for removal, and a tool of the present invention engaging an edge of the electrical box, the tool pivoted to remove a knock-out.
Figures 4, 5, 6:
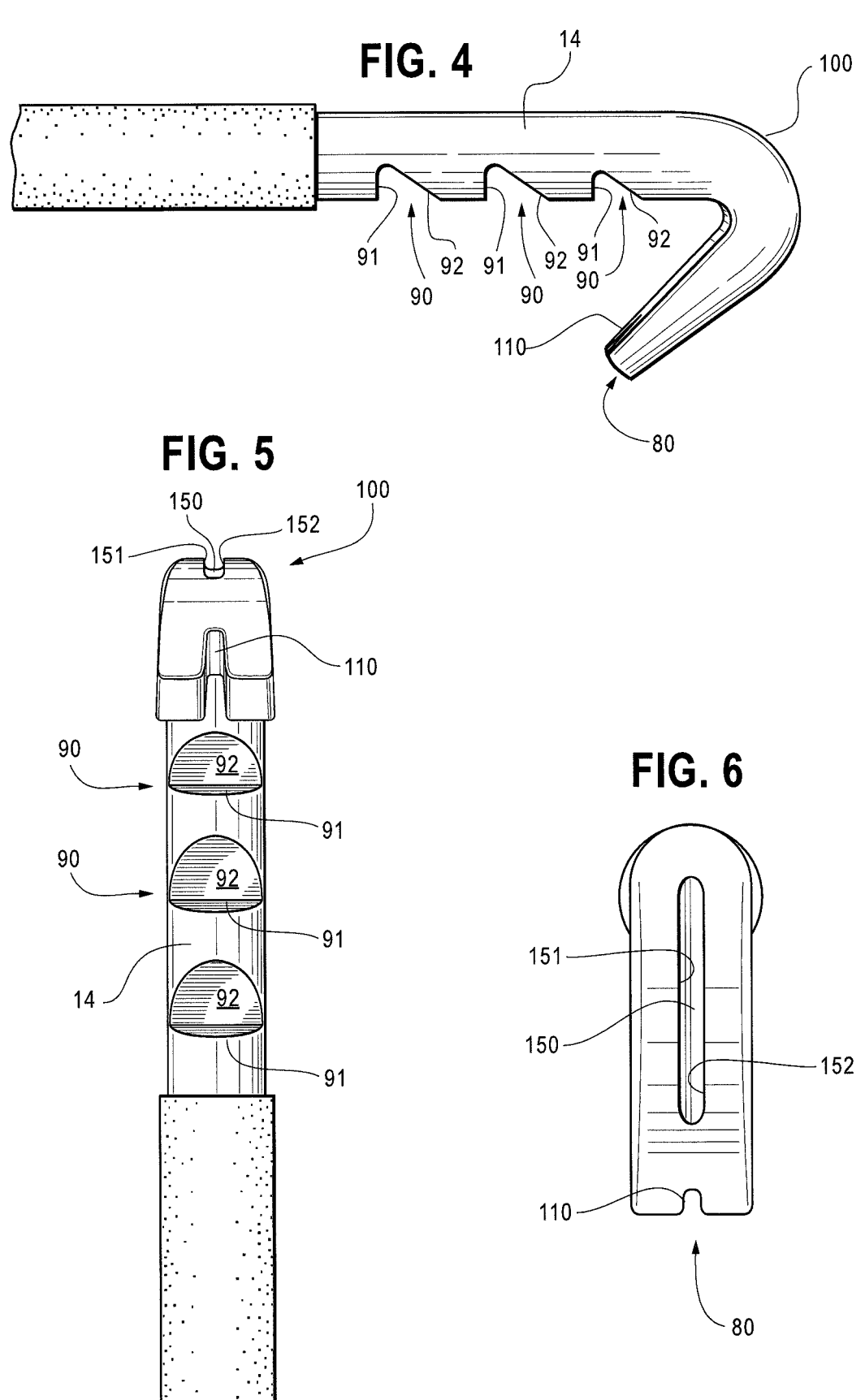
FIG. 4 is a side elevational view of the second end or hook end of the tool disclosed herein.
FIG. 5 is a front elevational view of the second end or hook end of the tool disclosed herein.
FIG. 6 is a top plan view of the second end or hook of the tool disclosed herein.

In use, the user grasps the tool by the handle and engages an edge of the electrical box in one of the notches, as shown in FIGS. 1-3. The user then pivots the tool about the engagement so that the second end of the tool pushes down on the knock-out selected for removal from the box. The downward force breaks some or all of the webs. It is common for the knock-out to hang by a web. In such an instance the user may use the slot at the second end of the tool to engage an edge of the knock-out. Once engaged, the user may manipulate the knock-out and break the web to detach the knock-out from the electrical box.

The foregoing disclosure of specific embodiments is intended to be illustrative of the broad concepts comprehended by the invention.

The invention claimed is:

1. A tool for removing knockouts from an electrical box, the tool including a rod having a first end and a second end, the first end of the rod extending from a handle, the rod being thinner than the handle, the rod including a first bend and a second bend, the second bend being a continuous bend, the first bend located between the first end and the second bend, the second bend located between the first bend and the second end, the second bend having an outside angle in the range of 270 to 350 degrees to thereby form a hook, the rod having a central primary axis between the first bend and the second bend, a notch formed in the rod, the notch located between the first bend and the second bend, the notch being open to the hook, the notch spaced from the second end to be engaged with a perimeter edge of the electrical box when the second end is in contact with a knockout and the tool is pivoted to break a web holding the knockout to the electrical box.

2. The tool of claim 1, further including a groove in the rod, the groove located at the second bend, the groove oriented in a plane of the central primary axis.

3. The tool of claim 2, wherein the groove is on an outside radius of the second bend.

4. The tool of claim 2, wherein the groove has a widest width less than 0.1 inch and the groove is widest at the top of the groove.

5. The tool of claim 2, wherein the groove has walls that are not parallel to each other.

6. The tool of claim 2, wherein the first bend, the second bend, and the groove all lie in a same plane.

7. The tool of claim 1, the tool including a slot in a portion of the rod between the second bend and the second end, the slot being in the same plane as the second bend, the portion of the rod between the second bend and the second end being straight.

8. The tool of claim 7, wherein the portion of the rod between the second bend and the second end includes a tapered blade, the slot located in the tapered blade.

9. The tool of claim 8, further including a second notch and a third notch, the tapered blade including a tip, the tip terminating even with the second notch.

10. The tool of claim 8, wherein the first end of the rod includes a second central primary axis along its length, the portion of the rod between the second bend and the second end not intersecting the second central primary axis.

11. The tool of claim 1, further including a plurality of notches formed in the rod, the notches located between the first bend and the second bend.

12. The tool of claim 11, wherein the notches are each defined by two walls, the walls extending towards the central primary axis.

13. The tool of claim 12, wherein the tool includes a slot in a portion of the rod between the second bend and the second end, the slot being in the same plane as the second bend, the portion of the rod between the second bend and the second end being straight, wherein each notch includes at least one of the walls being perpendicular to the central primary axis and at least one of the walls being perpendicular to the portion of the rod between the second bend and the second end.

14. A tool for removing knockouts from an electrical box, the tool including an elongate shaft having a first end and a second end, the first end of the shaft having a handle, the shaft being thinner than the handle, the shaft having a first bend and a second bend, the first bend located between the handle and the second bend, the second bend located between the first bend and the second end, the second bend being uninterrupted, defining a single interior vertex, and having an outside angle ranging from 270 to 350 degrees to thereby form a hook, the shaft having a first central primary axis at the first end and a second primary central axis between the first bend and the second bend, the second end including a tapered blade, the tapered blade including a slot, the slot having tapered walls, the slot, first bend, and second bend all being in a first plane, the first central primary axis not intersecting the tapered blade.

15. The tool of claim 14, further including a groove, the groove oriented in a plane of the second central primary axis, the groove being located at the second bend.

16. The tool of claim 14, wherein the shaft is generally round in cross section.

17. The tool of claim 14, wherein the handle extends outward from the shaft.

18. The tool of claim 14, further including a notch, the notch having a first wall and a second wall, the first wall being perpendicular to the second central primary axis of the shaft and the second wall being at an angle to the second central primary axis of the shaft, the first wall and the second wall meeting at a notch vertex, the notch vertex being in a second plane different from the first plane.

19. A tool for removing knockouts from an electrical box, the tool including a rod having a first end and a second end, the first end of the rod including a handle, the rod including a first bend and a second bend, the first bend located between the first end and the second bend, the second bend located between the first bend and the second end, the second bend being greater than 90 degrees to thereby form a hook, a plurality of notches located between the first bend and the second bend, the notches being open to the hook, at least one notch having a first wall and a second wall, the first wall being perpendicular to a central primary axis of the rod and the second wall being at an angle to the central primary axis of the rod, a groove located at an outside radius of the second bend, the groove having spaced apart walls, the second end terminating in a tapered blade, the tapered blade including a slot, the slot including tapered walls, the slot and the groove lying in a first plane.

20. The tool of claim 19, wherein the first wall and the second wall meet at a notch vertex, the notch vertex being in a second plane different from the first plane.

* * * * *